United States Patent [19]
Jacobs et al.

[11] Patent Number: 5,479,263
[45] Date of Patent: Dec. 26, 1995

[54] GRAY PIXEL HALFTONE ENCODER

[75] Inventors: Timothy W. Jacobs, Fairport; Jeffrey D. Kingsley, Williamson, both of N.Y.

[73] Assignee: Xerox Corporation, Stamford, Conn.

[21] Appl. No.: 84,096

[22] Filed: Jul. 1, 1993

[51] Int. Cl.[6] ............................... H04N 1/40; H04N 1/56
[52] U.S. Cl. ..................... 358/298; 358/456; 358/534; 358/539
[58] Field of Search ..................... 358/298, 426, 358/429, 434, 436, 438, 448, 455, 456, 458, 459, 465, 466, 534, 539; 382/166; 395/101, 109, 114, 117

[56] References Cited

U.S. PATENT DOCUMENTS

| | | |
|---|---|---|
| 4,868,587 | 9/1989 | Loce et al. ............................ 346/157 |
| 4,963,900 | 10/1990 | Henderson et al. ................. 358/298 |
| 5,072,291 | 12/1991 | Sekizawa ........................... 358/456 X |
| 5,198,898 | 3/1993 | Miyata ............................... 358/461 X |
| 5,323,247 | 6/1994 | Parker et al. ........................ 358/456 |

*Primary Examiner*—Peter S. Wong
*Assistant Examiner*—Eric Frahm
*Attorney, Agent, or Firm*—Oliff & Berridge

[57] ABSTRACT

A gray pixel encoding scheme is used in combination with a halftoner and an imager to produce halftoned images. A halftoner and an imager can be totally separate because the gray pixel encoding allows the imager to decode them at any time. The encoded gray pixels require less bandwidth than explicit gray pixels and can be decoded by the imager in an optimal fashion for the characteristics of the specific printer being used. An imager produces a small partial pixel within a spot boundary. The subpixel produced is called a gray pixel. The gray pixel is allowed to grow from a zero width to a full spot width and is allowed to start anywhere within the spot. The pixel codes describe the starting positions of the gray pixels, the locations of the gray pixels within the spot, and the gray pixel width required. The imager uses the encoded gray pixel from the halftoner to produce a final halftoned image. The list of encoded pixels produced by the halftoner can be stored and used at a later time or sent through a network to a different imager to be printed out.

19 Claims, 5 Drawing Sheets

| BITS PER PIXEL | GROWTH RULES | GRAY LEVELS PER PIXEL |
|---|---|---|
| 1 | 1 | 1 |
| 1 | 2 | NA |
| 1 | 3 | NA |
| 1 | N | NA |
| 2 | 1 | 3 |
| 2 | 2 | 2 |
| 2 | 3 | NA |
| 2 | N | NA |
| 3 | 1 | 7 |
| 3 | 2 | 4 |
| 3 | 3 | 3 |
| 3 | N | NA |
| 4 | 1 | 15 |
| 4 | 2 | 8 |
| 4 | 3 | 6 |
| 4 | N | 5 |
| 5 | 1 | 31 |
| 5 | 2 | 16 |
| 5 | 3 | 11 |
| 5 | N | 7 |
| 6 | 1 | 63 |
| 6 | 2 | 32 |
| 6 | 3 | 22 |
| 6 | N | 10 |
| 7 | 1 | 127 |
| 7 | 2 | 64 |
| 7 | 3 | 43 |
| 7 | N | 15 |
| 8 | 1 | 255 |
| 8 | 2 | 128 |
| 8 | 3 | 86 |
| 8 | N | 22 |

FIG.8

GRAY PIXEL HALFTONE ENCODER

BACKGROUND OF THE INVENTION

1. Field of the Invention

This invention relates to improvements in the encoding scheme of gray pixels. More particularly, this invention relates to gray pixel encoding schemes which are used in combination with a halftoning imaging that produces gray level halftoned images.

2. Description of Related Art

Xerographic printers use halftoning processes to generate digital images from originals. The image is formed by using pixels which are completely black, completely white or different shades of gray. These are represented as explicit gray pixels. When viewed from a distance, the pixels blend together to form the image.

In traditional binary xerographic printers, halftone methods use binary systems such that the laser has only two laser intensity levels: ON (black) and OFF (white). Another method is disclosed in U.S. Pat. No. 4,868,587 (Loce et al.), which uses two gray levels: the black and the white level for each pixel. The different levels of gray are based on the intensity of the laser light. Therefore, black has a higher light intensity than either of the gray levels. This method is an improvement over using only black and white pixels. The disadvantage of the system is that the control of the graying levels is difficult and the information is not easily transferable to other printers.

The quality of a binary xerographic printer is based on two important features: the halftone frequency, which is the number of halftone cells per linear inch; and the number of distinguishable gray steps. A typical number of halftone cells for good quality image is between 100 to 200 cells per inch. Usually around nine pixels are used per halftone cell. The maximum number of gray steps is limited to the number of pixels per halftone cell plus one. Therefore, a 3×3 halftone cell has about 10 output gray steps.

In the prior art, a halftone cell was divided into pixels which were turned either on or off to form reflectance modulation level. From a distance, the human eye detects a reflectance of about 0.5%, which would be interpreted as a gray level. In a good quality printer, the number of distinguishable gray steps should be around 100.

Halftone images are commonly used in printed materials to reproduce continuous tones using printers that are binary in nature. Conventional digital halftoning processes grow halftone dots by activating individual pixels within a halftone cell. The pixels are typically at printer resolution or at some small integral subdivision thereof. The printer resolution is broken down to the number of spots which are used. For example, a 400 SPI printer has a spot size of 1/400th of an inch. Pixels are used as data within the spot boundary.

SUMMARY OF THE INVENTION

A distinct advantage of the invention is that the halftoner and the imager can be totally separate, unlike the systems of the prior art. A gray pixel encoding scheme is used in combination with a halftoner and an imager to produce gray level halftoned images. The method overcomes the disadvantages of the prior art because the halftoner outputs encoded gray pixels that are decoded by the imager. Encoded gray pixels require less bandwidth than explicit gray pixels and can be decoded by the imager in an optimal fashion for the specific printer being used. For example, the black process control can modify the pixel decode tables to ensure consistent print density throughout the life of the printer.

An imager produces a small partial pixel within a spot boundary. The subpixel produced is called a gray pixel. The gray pixel is allowed to grow from a zero width to a full spot width and is allowed to start anywhere within the spot. The codes describe the starting positions of the gray pixels, the locations of the gray pixels within the spot, and the gray pixel width required. The imager uses the encoded information from the halftoner to produce a final halftoned image.

The list of encoded pixels produced by the halftoner can be stored and used at a later time or sent through a network to a different imager to be printed out. Pixel codes would be the same for all of the systems and an imager would modulate the halftoned image produced depending on the type of printer and printer's characteristics in order to create a clear copy of the original.

BRIEF DESCRIPTION OF THE DRAWINGS

The invention is illustrated in the accompanying drawings, in which like reference numerals are used to denote like similar parts, and wherein:

FIG. 8 is a table showing the number of gray levels that can be encoded within a pixel for different growth rules;

DETAILED DESCRIPTION OF THE PREFERRED EMBODIMENTS

While this invention is described in some detail herein, with specific reference to an illustrated embodiment, it is to be understood that there is no intent to be limited to that embodiment. On the contrary, the aim is to cover all modifications, alternatives and equivalents falling within the spirit and scope of the invention as defined by the claims. For example, the invention is applicable to any number of halftone cell configurations. Furthermore, the invention is not limited to printing devices. Any image rendering device that performs halftoning may employ the described halftoning method, such as, for example, a CRT display device. Although this invention uses a laser imaging system commonly called a raster output scanner (ROS), an LED system and the like can also be used.

Figure 1:
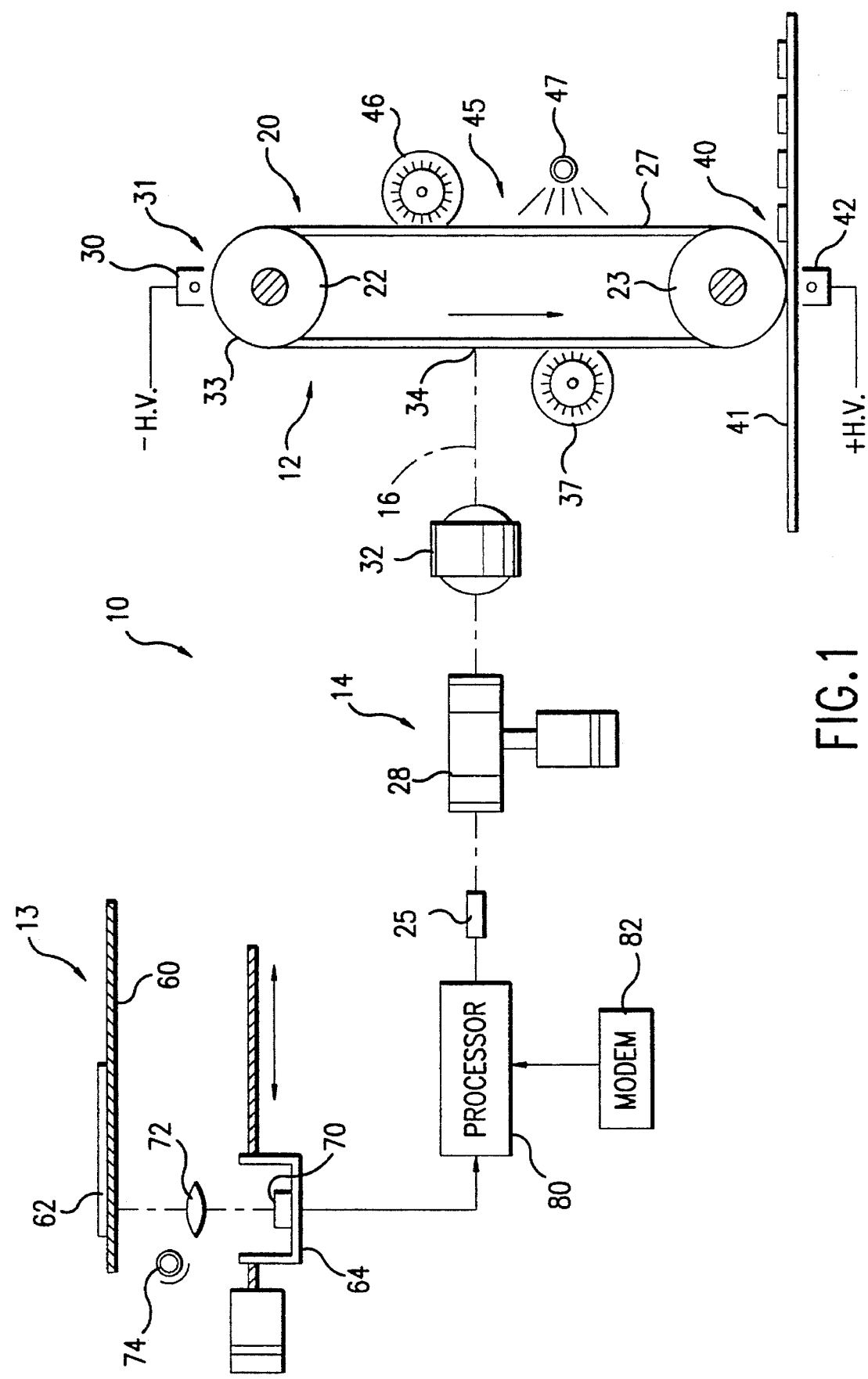
FIG. 1 is an exemplary electronic printer.

FIG. 1 shows an exemplary electronic printer 10. Printer 10 includes a xerographic processing section 12, a document scanning section 13, and an image printing section 14.

Xerographic processing section 12 has a photoreceptor 20 in the form of an endless belt stretched across drive belt support roller 22 and idler belt support roller 23. Latent electrostatic imager representative of the image signal input are created on the photoreceptor 20. Belt supporting rollers 22, 23 are rotatably mounted in predetermined fixed position by suitable means (not shown). Roller 23 is driven from a suitable drive motor (not shown) to move photoreceptor 20 in the direction shown by the solid line arrow. The photoreceptor 20 could also be a photoreceptor drum or another equivalent device.

A corona charging device 30, which is commonly known as a corotron, is operatively disposed adjacent the photoreceptor 20 at charging station 31. Corotron 30, which is coupled to a suitable negative high voltage source (–H.V.), places a uniform negative charge on the photoreceptor 20 in preparation for imaging.

The image printing section 14 includes a variable pulse width imaging beam of light 16 for scanning across photoreceptor 20 at exposure point 34. Imaging beam 16 is derived from an individual self modulated I.R. diode laser 25. Beam 16 is swept across photoreceptor 20 by a rotating polygon 28. A suitable lens 32 focuses the imaging beam 16 onto the photoreceptor 20. The charges on the photoreceptor are selectively dissipated as the imaging beam 16 sweeps across the photoreceptor 20. The latent electrostatic image formed on photoreceptor 200 corresponds to the original document.

A development subsystem 37, which is illustrated as a magnetic brush roll, is disposed in operative contact with the photoreceptor 20 downstream of the exposure point 34. The toner, which is a relatively small colorant material, is loaded onto the development subsystem's magnetic brush roll. Due to electrostatic forces on the charged photoreceptor, the toner is attracted to the charges forming the latent electrostatic image.

Following development of the latent electrostatic image on the photoreceptor 20 by developing subsystem 37, the developed image is transferred to a suitable copy sheet 41 (i.e., paper) at transfer station 40. To facilitate transfer, a transfer corotron 42, which is coupled to a high voltage power source (+H.V.), attaches the developed image on the photoreceptor 20 to the copy sheet 41. Following transfer, the developed image is fixed by fusing. Any residual charges and/or developing material left on photoreceptor 30 are removed at cleaning station 45 by erase lamp 47 and cleaning brush 46.

At document scanning section 13, image data in the form of electrical signals representative of the document reflectance are generated. An original document 62 to be copied is placed on a transparent platen 60. The positioning of the document is performed either manually or by an automatic document handler (not shown). A suitable carriage 64, supported for reciprocating back and forth movement below platen 60, has mounted at least one linear scanning array 70. Array 70 may be any suitable scanning array type as, for example, a CCD. Carriage 64 is driven by a suitable reversible driver such as a step motor (not shown). The lens 72 focuses array 70 on a line of the original document 62. A suitable lamp 74 illuminates the document line being scanned by array 70. The output signal from the array 70 is sent to the processor 80. In the alternative, a modem 82 can be used to receive signals from another source, i.e., a computer, and thereby bypass the document scanning section 13.

Figure 2:
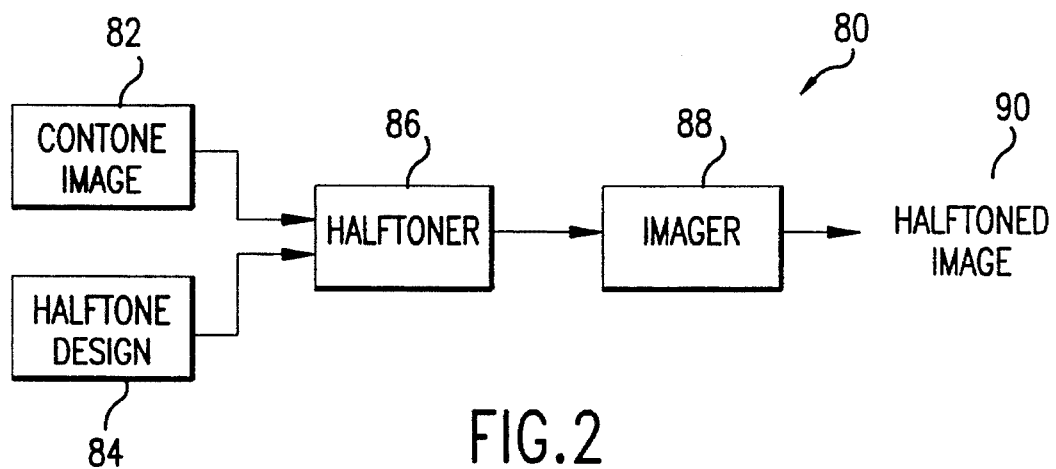
FIG. 2 is a block diagram of the a printer generating a halftone image using the method of the prior art.

FIG. 2 shows a block diagram of a processor 80 generating a halftoned image 90 of the prior art. A contone image 82 is a continuous tone image representing the gray pixels. For example, an eight bit word is used for each pixel to represent 256 levels of gray.

The halftone design 84 is a binarized representation of the image. The halftone design 84 consists of the rules which dictate the fill-in order and the screen design. The fill-in order determines which pixel on the halftone cell gets turned on first, second, third, etc. For example, an N×M arrangement would dictate for each pixel whether it is either on or off. The screen design is the orientation of the pixels on the screen. For example, the pixels may be aligned at 0° to form a grid of pixel in rows and columns. The pixels could be aligned at a 45° angle to form a grid of diagonal lines. In color printing, there are four angles in which the pixels are aligned: 0°, 45°, ±15°. Another aspect of the screen design is the order of turning on the pixels. In clustered dot design, a pixel begins the design and adjacent pixels are turned on in a row, column or spiral fashion. In dispersed dot design, the pixels are turned on without the adjacent pixel being on.

The contone image 82 and the halftone design 84 are input to the halftoner 86. The halftoner 86 generates bits which form explicit gray pixels. These bits represent a binarized image which is input to the imager 88. The imager forms the halftoned image 90 which activates the laser 25 in FIG. 1.

Figure 3:
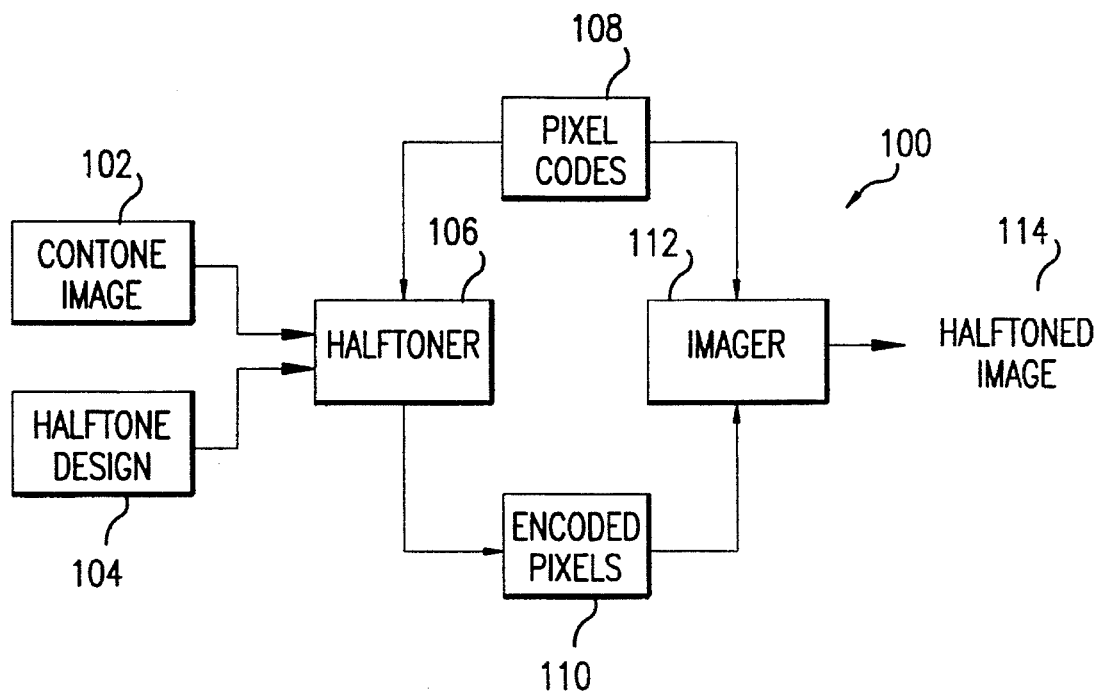
FIG. 3 is a block diagram of a printer generating a halftone image using the method of the present invention.

FIG. 3 shows a block diagram of a processor of the invention. The contone image 102 and the halftone design 104 are inputs to the halftoner 106. Pixel codes 108 are predetermined decoding of pixels into certain specific states. For example, when the pixels can be represented in eleven different states, then the characteristics of each state do not change. These pixel codes 108 are input into the halftoner 106.

Encoded gray pixels 110 are generated from the three signals by the halftoner 106. These encoded gray pixels 110 require less bandwidth (i.e., fewer bits) than explicit gray pixels of the prior art. For example, the explicit gray pixel may consist of eight bits, but the encoded gray pixel 110 may be only four bits because of the standardized use of pixel codes 108.

These encoded gray pixels 110 are then delivered to the imager 112 to be used immediately. In the alternative, the encoded gray pixels 110 can be stored for later use. Furthermore, the encoded gray pixels 110 can be decoded by the imager 112 in an optimal fashion depending on the type of printer attached. The imager 112 will produce the specified darkness for that specific printer. For example, each printer has specific characteristics that may change depending on how long the printer has been in use, the age of the printer, the alignment of the laser and lens, etc. By using the standard encoded gray pixels 110, the imager 112 can compensate for these variable characteristics. Another advantage to the invention is that the encoded gray pixels 110 can be used by different imagers 112 and still have the same result which is especially useful in network systems having more than one printer.

The encoding of the invention specifies the gray pixel darkness. This may include the density of the pixel, the position within the pixel that the graying takes place. Other pixel attributes may be encoded such as color separation, allowing the imager to treat different colored pixels differently. The encoding, therefore, allows the halftone cell to be defined independent of the printing operation because the imager will produce the specified darkness for that specific printer.

The encoding scheme will now be described. Gray pixels will be produced by the imaging hardware using a look-up-table (LUT) that allows a single variable pulse width to be placed anywhere within a pixel boundary. The LUT of the preferred embodiment contains 256 elements, but any number of elements could be used. The LUT encodes both the position and the width of the gray pixel. Therefore, some of the bits of the gray pixel output from the halftoner are used to encode position and some of the bits are used to encode pulse width.

For example, a pixel may have two intermediate gray levels plus white and black. Because white is not included as a graying level, the pixel is considered to have three gray levels. A single growth rule can be used, for example, growing from the center. Therefore, the pixel can use two bits to encode all four levels of the pixel. If two growth rules are used, i.e., growing from either the right edge or the left edge of the pixel, one bit would be needed to encode which growth rule to use. Therefore, a 2-bit pixel would not be adequate. By imposing growth rules on the gray pixels, the encoded halftoned pixel bits can be used to represent more gray levels because the position information is implied.

Figure 4:
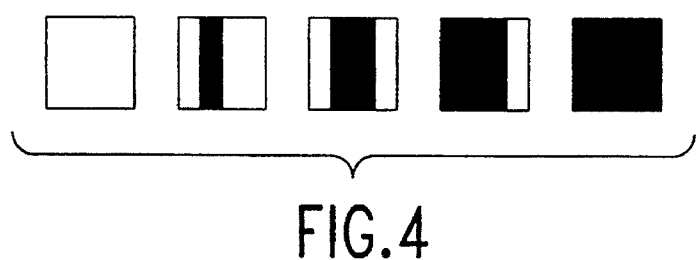
FIG. 4 shows the gray pixels produced by using one growth rule.

Referring to FIG. 4, graying pixels that use only one growth rule are shown. The rule is to fill from the center. Therefore, there are five unique states for the one rule. This first example constrains the gray pixel pulses to start in the center of the pixel and grow out. When one rule is shown, there is no information needed to be encoded into the pixel. The number of states required to encode the gray level is as follows:

$$S = G + 1 \quad (1)$$

where S is the number of states required to encode the gray levels; G is the number of gray levels allowed for the pixel; and the one is for the white pixel state.

Figure 5:
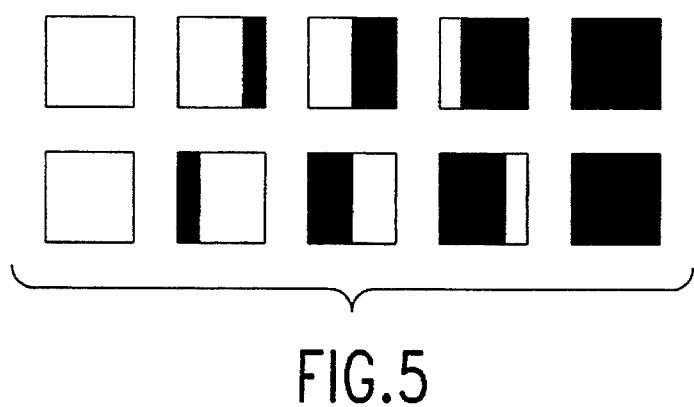
FIG. 5 shows the gray pixels produced by using two growth rules.

For FIG. 5, two rules were used. One rule allows the pixel to fill in from the right and the second rule allows the pixel to fill in from the left. Therefore, there are eight unique states using two rules. The number of unique states can be determined by the following equation:

$$S = G + (G-1) + 1 = 2G \quad (2)$$

where S is the number of states and G is the number of gray levels allowed for the pixel.

Figure 6:
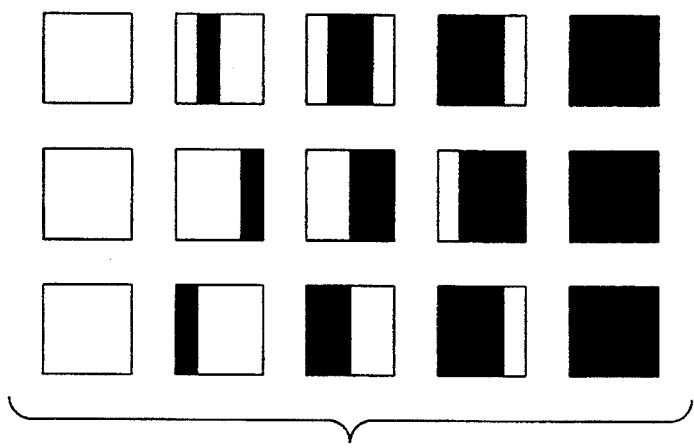
FIG. 6 shows the gray pixels produced by using three growth rules.

In FIG. 6, there are three rules which allow ten unique states. The rules are: grow from right, grow from left, and grow from center. The number of unique states can be determined by the following equation:

$$S = G + (G-1) + (G-2) + 1 = 3G - 2 \quad (3)$$

similar to equation 1 and 2, S and G represent the same functions.

In general, the number of unique states needed for any given number of rules can be determined by the following equation:

$$S = R \times G - \left( \sum_{n=1}^{R-1} n \right) + 1 \quad (4)$$

where S is the number of states required to encode the gray levels; G is the number of gray levels allowed for the pixel; R is the number of rules; and the "1" represents the white pixel state.

To determine the number of states needed to encode all possible pulse widths and position states, the following equation is used:

$$S = G^2 - \left( \sum_{n=1}^{G-1} n \right) + 1 \quad (5)$$

Figure 7:
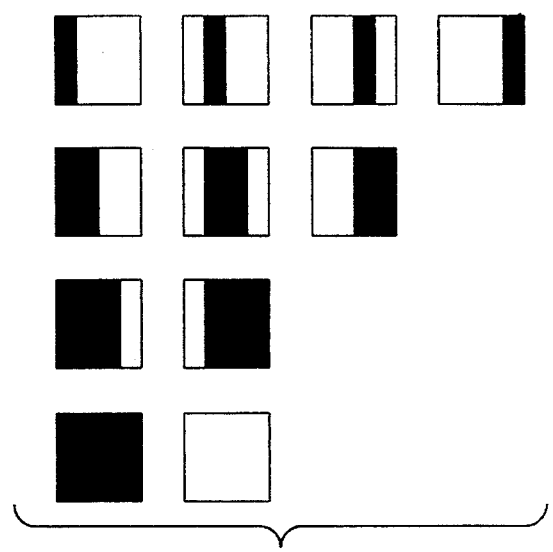
FIG. 7 shows all allowable pulse widths and positions states for a pixel with four gray levels.

Using this equation to find the maximum number of fill in rules, any pixel within the cell can have any allowable pulse. In FIG. 7, there are 4 gray levels (G=4) to form the 11 allowable states.

The number of states given by Equation 5 will be adequate to encode any growth rule for the pixel. This is called the "N Rules" case. Different halftone designs will need different numbers of growth rules. For example, a line screen can be made by using only one growth rule dictating growth from the center out. A more conventional halftone design might need three pixel growth rules: growth from the left; growth from the right; and growth from the center.

The number of bits needed to encode all the states is simply:

$$B = \log_2(S) \quad (6)$$

where B is the number of bits and S is the number of states.

By substituting for S in Equation 6 by using Equation 5 and solving for G, the maximum number of gray levels per pixel for a given pixel depth (bits/pixel) and the number of rules needed for any particular halftone cell design can be calculated. Referring to the Table shown in FIG. 8, this calculation has been done for one bit to eight bits per pixel, and 1, 2, 3, and N growth rules. For example, when there is 1 bit per pixel and 1 growth rule used, there is only 1 gray level encoded per pixel, i.e. black. Therefore, one pixel can only have the state of either black or white. If there are two bits per pixel and only one growth rule, then there are three gray levels encoded per pixel, i.e., black, white and two levels of gray.

Figure 9:
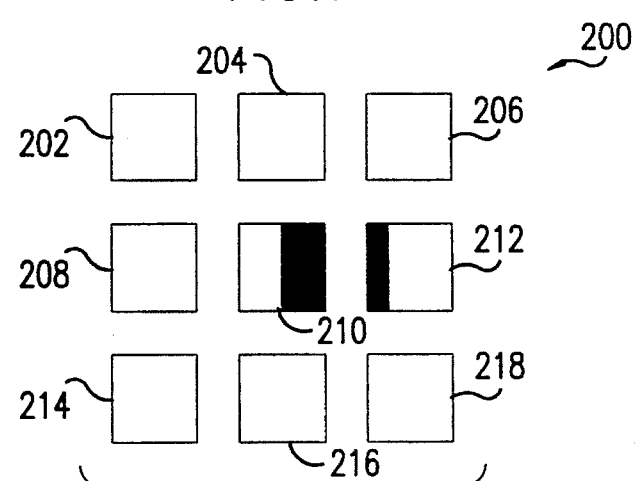
FIG. 9 is a halftone cell that has some encoded gray pixels in a cluster dot design.

Referring to FIG. 9, a halftone cell 200 is shown which consists of nine pixels 202—218. First, a halftone cell 200 begins with a half gray in pixel 210 and the rest of the pixels are white. The encoded pixel would have a code stating that one-quarter gray was required and therefore the pixel code would determine in the imager that the center going left or going right would be required. The encoding could expand the filling of the pixel to being half gray. The encoding does not need to fill the entire pixel 210, but may begin filling an adjacent pixel 212 with a quarter gray beginning on the left side and moving toward the center of pixel 212. Similarly, the pixels above and below could be used to increase the gray component of the halftone cell 200. This method is called clustered dot design and can be used in a raster output scanner.

Figure 10:
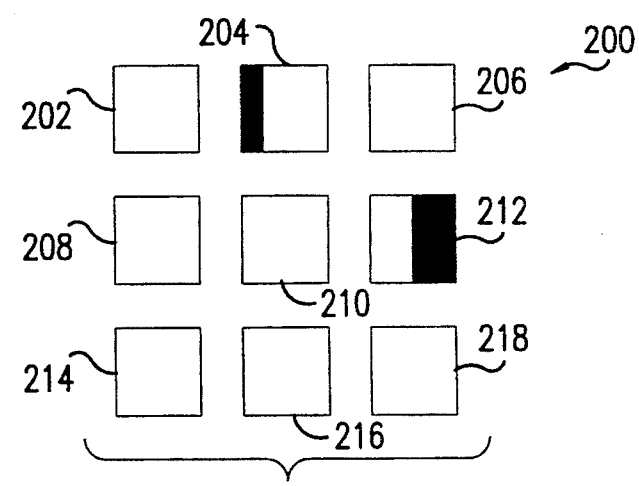
FIG. 10 is a halftone cell that has some encoded gray pixels in a dispersed dot design.

In dispersed dot design, the pixel 204 could be encoded to partially fill from the right and pixel 212 could be encoded to partially fill from the left. The result would be the halftone cell in FIG. 10.

One advantage of this invention is that the halftoner 106 and the imager 112 can be totally separate. In the prior art, these usually were linked together. In the invention, the halftoner 106 produces by using the pixel codes 108 a list of encoded pixels 110 that can be stored and used at a later time or sent through a network to a different imager to be printed out. Pixel codes 108 would be universal to the system, and therefore, any imager would modulate the picture depending on the type of printer and the specific characteristics of the printer in order to repeatedly produce a copy of the original image.

Although the invention has been described and illustrated with particularity, it is intended to be illustrative of preferred embodiments. It is understood that the disclosure has been made by way of example only. Numerous changes and the combination and arrangements of parts, steps, and features can be made by those skilled in the art without departing from the spirit and scope of the invention, as hereinafter claimed.

What is claimed is:

1. A method for generating a halftoned image from an original image comprising the steps of:

producing a continuous tone image from the original image;

producing a halftone design from the original image;

generating encoded gray pixels based on the continuous tone image, the halftone design and pixel codes; and generating the halftoned image based on the encoded gray pixels and the pixel codes.

2. The method according to claim 1, wherein the continuous tone image and the halftone design are generated by a scanner.

3. The method according to claim 1, wherein the encoded gray pixels are generated by a halftoner.

4. The method according to claim 1, wherein the pixel codes are growth rules dictating that a pixel is filled from a center region to an edge of the pixel.

5. The method according to claim 1, wherein the pixel codes are growth rules dictating that a pixel is filled from an edge to a center region of the pixel.

6. The method according to claim 10 wherein the pixel codes are growth rules dictating that a pixel is filled from a center region to an edge, and from the edge to the center region.

7. The method according to claim 5, wherein the edge is at least one of a top edge, a bottom edge, a right edge, and a left edge of the pixel.

8. The method according to claim 1, wherein the pixel codes are growth rules dictating that after a pixel is filled from a center region to a common edge of an adjacent pixel, then the adjacent pixel is filled from the common edge to the center.

9. The method according to claim 1, wherein the pixel codes are growth rules dictating that pixels are filled in a cluster dot design.

10. The method according to claim 1, wherein the pixel codes are growth rules dictating that pixels are filled in a dispersed dot design.

11. The method according to claim 1, wherein a halftone cell contains a plurality of pixels which are filled by specific growth rules.

12. An apparatus for generating a halftoned image from an original image comprising:

a halftoner generating encoded gray pixels based on pixel codes and imaging signals; and an imager producing the halftoned image based on the encoded gray pixels and the pixel codes, wherein the imaging signals are continuous tones of the original image and a halftone design of the original image.

13. The apparatus according to claim 12, wherein the encoded gray pixels define color shading in a color printer.

14. The apparatus according to claim 12, wherein the imaging signals are produced by an image scanner.

15. The apparatus according to claim 12, wherein the imaging signals are produced by a computer.

16. The apparatus according to claim 12, wherein the encoded gray pixels are stored in a memory device.

17. The apparatus according to claim 12, wherein the halftoner and the imager are separate devices.

18. The apparatus according to claim 12, wherein the pixel codes are growth rules dictating that a pixel is filled by at least one of the following growth rules: from a center region to an edge, and from the edge to the center region of the pixel.

19. The apparatus according to claim 18, wherein the edge is at least one of a top edge, a bottom edge, a right edge, and a left edge of the pixel.

* * * * *